United States Patent
Belikov et al.

(10) Patent No.: US 7,538,815 B1
(45) Date of Patent: May 26, 2009

(54) AUTOFOCUS SYSTEM AND METHOD USING FOCUS MEASURE GRADIENT

(75) Inventors: Sergey Belikov, Palo Alto, CA (US); Marian Enachescu, Richmond, CA (US)

(73) Assignee: Marena Systems Corporation, Hayward, CA (US)

( * ) Notice: Subject to any disclaimer, the term of this patent is extended or adjusted under 35 U.S.C. 154(b) by 956 days.

(21) Appl. No.: 10/350,130

(22) Filed: Jan. 23, 2003

Related U.S. Application Data (60) Provisional application No. 60/350,073, filed on Jan. 23, 2002.

(51) Int. Cl.
*H04N 5/232* (2006.01)

(52) U.S. Cl. ............... 348/353; 348/79; 348/80; 348/345

(58) Field of Classification Search ............ 348/79, 348/80, 345–356
See application file for complete search history.

(56) References Cited

U.S. PATENT DOCUMENTS

| | | | | |
|---|---|---|---|---|
| 4,558,367 A | * | 12/1985 | Urata et al. ............ | 348/350 |
| 4,755,874 A | | 7/1988 | Esrig et al. ............ | 358/106 |
| 5,005,086 A | * | 4/1991 | Iwamoto et al. ........ | 348/356 |
| 5,193,124 A | | 3/1993 | Subbarao ............... | 382/41 |
| 5,231,443 A | | 7/1993 | Subbarao ............... | 354/400 |
| 5,486,860 A | | 1/1996 | Shiokawa et al. ....... | 348/354 |
| 5,614,951 A | * | 3/1997 | Lee et al. .............. | 348/356 |
| 5,634,151 A | | 5/1997 | Kim ..................... | 396/106 |
| 5,737,090 A | | 4/1998 | Christopher et al. .... | 358/299 |
| 5,774,573 A | | 6/1998 | Caspi et al. ........... | 382/141 |
| 5,783,814 A | | 7/1998 | Fairley et al. ......... | 250/201.3 |
| 5,854,602 A | | 12/1998 | Stankwitz et al. ....... | 342/25 |
| 5,898,494 A | | 4/1999 | Csipkes ................. | 356/345 |
| 5,912,699 A | * | 6/1999 | Hayenga et al. ........ | 348/132 |
| 5,932,872 A | | 8/1999 | Price ................... | 250/201.3 |
| 5,982,945 A | | 11/1999 | Neff et al. ............ | 382/271 |
| 6,037,892 A | | 3/2000 | Nikias et al. .......... | 342/25 |
| 6,128,444 A | | 10/2000 | Sensui .................. | 396/114 |
| 6,130,716 A | | 10/2000 | Hirasawa ............... | 348/347 |
| 6,151,415 A | | 11/2000 | Acharya et al. ........ | 382/255 |
| 6,201,619 B1 | | 3/2001 | Neale et al. ........... | 358/505 |
| 6,222,588 B1 | | 4/2001 | Yamazaki et al. ....... | 348/355 |
| 6,373,481 B1 | | 4/2002 | Tan et al. .............. | 345/342 |

(Continued)

OTHER PUBLICATIONS

"TNP Model MT-405 & RF-405 Motorized Turret & Remote Focus System". Copyright © 1999 TNP Instruments, Inc., California, USA. Downloaded from webmasters@tnpinstrument.com. 3 pages.

(Continued)

*Primary Examiner*—Sinh N Tran
*Assistant Examiner*—Anthony J Daniels
(74) *Attorney, Agent, or Firm*—Swernofsky Law Group PC (57) ABSTRACT

Described are autofocusing algorithms and system implementations for machine inspection applications. The disclosed algorithms depend neither on the type of image (visual, infrared, spectrometric, scanning, etc.) nor on the type of image detector. Disclosed image filtering techniques, image focus measure functions and adaptive velocity control methods can be used in computer-based inspection systems for many different types of cameras and detectors as well as for a variety of magnification levels. The proposed autofocusing system can utilize the existing imaging hardware of the inspection system and does not require any additional components.

2 Claims, 7 Drawing Sheets

U.S. PATENT DOCUMENTS

| | | | | |
|---|---|---|---|---|
| 6,381,372 | B1 | 4/2002 | Loce | 382/261 |
| 6,389,163 | B1 | 5/2002 | Jodoin et al. | 382/173 |
| 6,396,039 | B1 | 5/2002 | McCreary | 250/201.2 |
| 6,399,937 | B1 | 6/2002 | Huang et al. | 250/216 |
| 6,411,731 | B1 | 6/2002 | Saito | 382/173 |
| 6,463,214 | B1 | 10/2002 | Nakata | 396/104 |
| 7,110,035 | B1 * | 9/2006 | Hellstrand | 348/350 |
| 2001/0035910 | A1 * | 11/2001 | Yukawa et al. | 348/349 |
| 2002/0080258 | A1 * | 6/2002 | Ohta | 348/347 |

OTHER PUBLICATIONS

"Focusing Techniques," by Murali Subbarao, Tae Choi, and Arman Nikzad. Tech. Report 92.09.04. Department of Electrical Engineering, State University of New York at Stony Brook, Stony Brook, New York 11794-2350. Sep. 4, 1992. pp. 1-33.

"Root-Mean Square Error in Passive Autofocusing and 3D Shape Recovery," by Murali Subbarao and Jenn-Kwei Tyan. Department of Electrical Engineering, State University of New York, Stony Brook, NY 11794-2350. 16 pages. 1996.

AXSYS Technologies, Lasertrac™ Autofocus, product summary. 2 pages. Sep. 2000.

"Selecting the Optimal Focus Measure for Autofocusing and Depth-from-Focus," by Murali Subbarao and Jenn-Kwei Tyan. Department of Electrical Engineering, State University of New York, Stony Brook, NY 11794-2350. 21 pages. 1998.

* cited by examiner

AUTOFOCUS SYSTEM AND METHOD USING FOCUS MEASURE GRADIENT

BACKGROUND

Many imaging system are adapted to automatically focus on an object of interest, and to maintain that focus as the object moves with respect to the imaging system. The autofocus methods discussed below are typical of machine inspection systems for testing/inspecting liquid-crystal and flat-panel displays, printed circuit boards, MEMS-based circuits, semiconductor devices/wafers, biomedical specimens, etc. These system are typically focused by adjusting the spacing between the image detector (e.g., camera) and the object of interest. The following discussion describes autofocus systems that adjust the level of focus by moving the image detector relative to the object of interest, but may also be applied to systems that employ adjustable lens configurations. One such system is described in U.S. patent application Ser. No. 10/348,940 to Enachescu and Belikov, entitled "Methods and Systems Employing Infrared Thermography for Defect Detection and Analysis," filed Jan. 22, 2003, which is incorporated herein by reference.

Autofocus methods for machine inspection systems can be broadly separated into two main categories: position sensing and content analysis. Position sensing methods measure the distance between the image detector and object and focus the image detector accordingly. In typical inspection systems, position-sensing autofocus methods maintain a constant distance between the object and the image detector. Position-sensing autofocus systems typically include a feedback control system that moves the object and/or the imaging system to maintain the correct distance. The LaserTrack™ Laser Tracking AutoFocus from Teletrac, Inc., of Santa Barbara, Calif., is an example of a position-sensing autofocus system.

There are several disadvantages of position sensing methods. First, the distance maintained by the autofocus control system must be calibrated to coincide with the best-focus position of the image detector. Second, only a small portion of the object of interest is used to measure the distance, so other parts of the object may not be optimally focused. Third, distance measurement may be unsuitable for some objects; for example, laser-based distance sensing may not work if the object has holes.

Content-analysis methods achieve and maintain the best-focus position by processing images acquired by the imaging system. Systems employing such methods apply a focus-measure function (FMF) to each of a series of images taken at various focus positions. The resulting collection of focus measures is then analyzed to determine the best-focus position. Content-analysis methods overcome many of the disadvantages associated with position-sensing methods because content-analysis methods rely upon images, and not some secondary indicia of focus distance, to calculate the best-focus position.

In typical inspection systems, FMFs derive a focus measure based in part on the distance between the image detector and the object. Plotting focus measures as a function of distance produces a focus-measure plot, the peaks of which may be correlated with position to find the best-focus position. FMFs preferably have the following major properties:

1. unimodality, or the existence of a single peak, maximum or minimum, within the range of interest.
2. accuracy, or coincidence, of the peak with the best-focus position;
3. reproducibility, or a sharp peak;
4. range (e.g., the focus range over which the FMF will unambiguously determine the direction to the best-focus position);
5. general applicability, or the ability to work on different classes of images;
6. insensitivity to changes in parameters that do not impact focus, such as changes in mean image intensity;
7. video-signal compatibility, or the ability to use the same image signals utilized for image analysis; and
8. speed: it should be possible to calculate the FMF rapidly.

For additional background information regarding FMFs, see "Focusing Technique," by Subbarao, Choi and Nikzad, (Journal of Optical Engineering, pp. 2824-2836, November 1993), and U.S. Pat. No. 5,932,872 to Price, both of which are incorporated herein by reference. Portions of those references are summarized below.

A focused image, represented by I(x,y) at point (x,y), is defined as the total light energy incident on the entrance pupil (e.g., the camera aperture) during one exposure period from the object point along the direction corresponding to (x,y). A point-spread function (PSF) defines the blur (or spread) corresponding to a single point in the image I(x,y) when the image is out of focus. Equation 1 provides a realistic model of a PSF:

$$h(x, y) = \begin{cases} \frac{1}{\pi R^2} & \text{if } x^2 + y^2 \leq R \\ 0 & \text{otherwise} \end{cases} \quad (1)$$

where R is the radius of the blur circle, and the ideal focus corresponds to a PSF of $h(x,y)=\delta(x,y)$, where $\delta(x,y)$ is the delta function. The blur radius is given by:

$$R = \frac{Ds}{2}\left(\frac{1}{f} - \frac{1}{u} - \frac{1}{s}\right) \quad (2)$$

where D is the aperture diameter, f is the focal length, s is the distance between the lens plane and the imaging surface of the image detector (e.g., the focal-plane array), and u is the distance between the lens plane and the object plane. In this formula, R can be positive (if the imaging surface is behind the focused image) or negative (if the imaging surface is in front of the focused image). In practical imaging systems one can change either u (by moving the image detector) or s (by moving the lens). For the ideally focused image, this formula gives $R \to 0$.

The Fourier transform of PSF h(x,y) is termed an "Optical Transfer Function" (OTF). The OTF attenuates high spatial frequencies (sharpness) within the image I(x,y) more significantly for larger radii R of the blur circle; in other words, larger blur circles imply blurrier images. One can therefore measure sharpness and focus based on the high spatial frequency content of an image. One can further develop a focus measure indicative of the high spatial frequency content of an image by applying a high-pass filter (linear or nonlinear) to each image I(x,y) and taking the average intensity value (or average energy) of the filtered image. A series of images, each taken at a unique focus distance, can be similarly analyzed to provide focus measures for various focus levels. These focus measures can then be analyzed to find the best-focus position.

A number of references describe means of obtaining focus measures suitable for identifying a best-focus position for various imaging systems, objects of interest, and levels of magnification. These references include: U.S. Pat. Nos. 5,231,443; 5,932,872; 6,037,892; 6,201,619; 6,463,214; 6,151,415; 6,373,481; and 6,222,588; and an article entitled "Selecting the Optimal Focus Measure for Autofocusing and Depth-from-Focus," by Subbaro and Tyan, published in IEEE Transactions on Pattern Analysis and Machine Intelligence, Vol. 20, No. 8, pp. 864-870, August 1998): each of these documents is incorporated herein by reference. A conventional system that uses a computer-based autofocusing method is ProbeMagic™ system from TNP Instruments Inc. (Carson, Calif.). That system performs autofocusing so-called Roberts cross gradient for a FMF. This implementation moves the focus motor up and down to determine best focus. One disadvantage of this implementation is that it uses a single filter (Roberts) that cannot be adapted to a variety of images. In addition, the implementation does not include adaptive autofocusing, i.e. the autofocusing is not performed in real-time.

Many of the available methods are not generally applicable to different classes of images, a significant shortcoming for imaging systems that look at different kinds of images. Furthermore, adaptive motion-control algorithms are usually implemented either electronically or in embedded microprocessors, and are consequently difficult to reconfigure for different types of images. There is therefore a need for a fast, precise autofocus method that is easily adapted for use with different imaging systems and different types of images.

DETAILED DESCRIPTION

Figure 1:
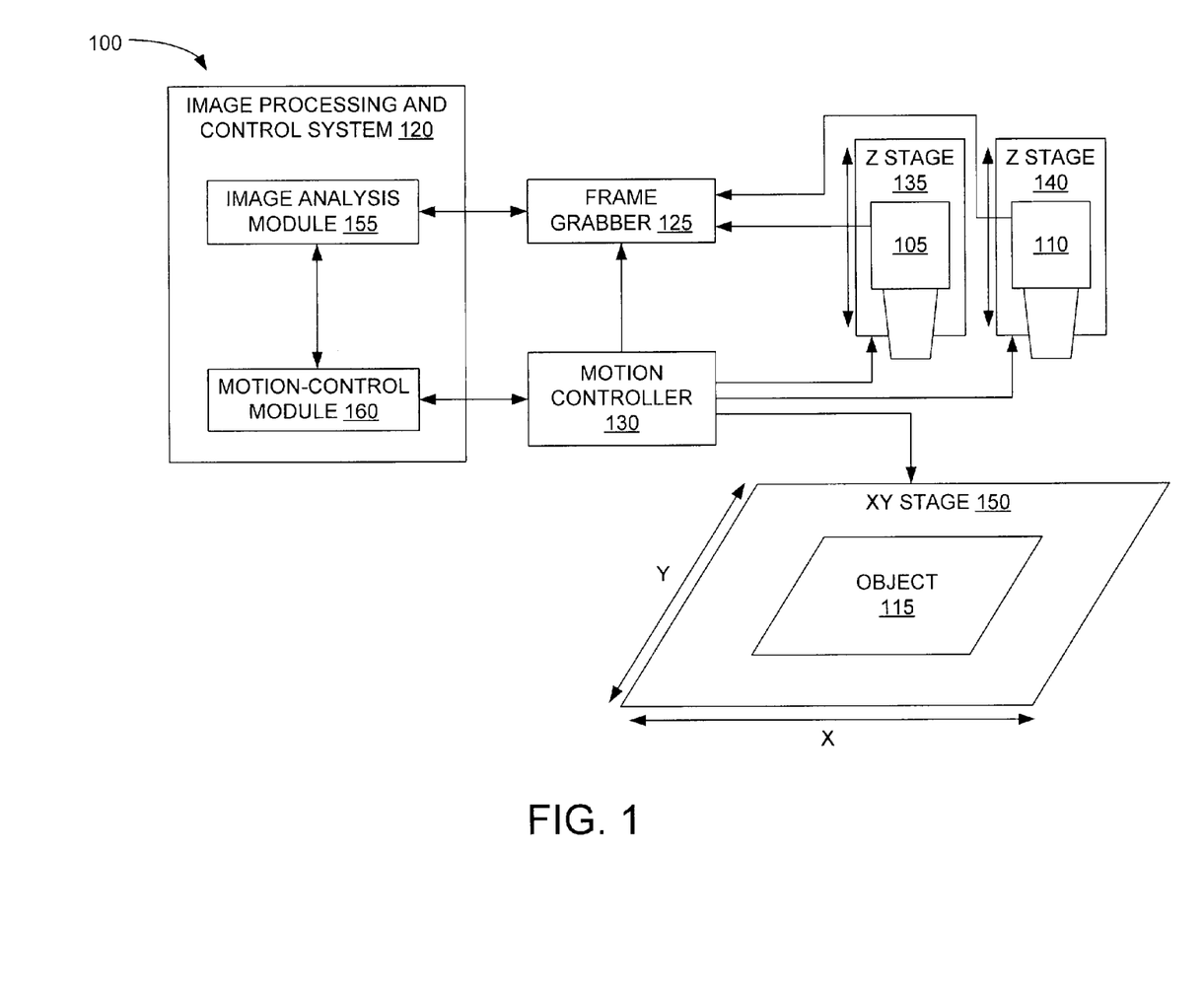
FIG. 1 depicts an inspection system 100 adapted in accordance with one embodiment.

FIG. 1 depicts an inspection system 100 adapted in accordance with one embodiment. System 100 includes one or more appropriate image detectors, an infrared camera 105 and a visual camera 110 in this example, oriented to image an object of interest 115. An image-processing and control system 120 captures images from cameras 105 and 110 via a conventional frame grabber 125. Image detectors 105 and 110 include, or are supported by, some form of focus mechanism. In this example, a computer-controlled motion controller 130 issues control signals to respective mechanical, motorized Z stages 135 and 140 to vary the distances between each camera and object 115. A mechanical, motorized X-Y stage 150, also computer controlled, moves object 115 within the cameras' fields of view. In one embodiment, system 120 is a general-purpose computer in which are instantiated, in software, an image analysis module 155 and a motion control module 160.

In response to commands from motion-control module 160, motion controller 130 conveys trigger signals to frame grabber 125 to coordinate X, Y, and Z stage positions with captured images. Module 155 analyzes captured images and, if the image is deemed to be out of focus, issues commands to motion-control module 160 to change the velocity and/or direction of the appropriate Z stage.

In accordance with one embodiment, image-analysis module 155 calculates FMFs that are independent of the type of camera, the level of magnification, or the type of image. These qualities render such embodiments important for use with machine inspection systems, especially infrared and visual, for testing/inspecting flat-panel displays, PCB boards, MEMS-based circuits, semiconductor devices/wafers, biomedical specimens, etc.

In some embodiments, image-analysis module 155 uses a set of high-pass (sharpness) filters together with a flexible, general-purpose FMF structure. The FMF structure selected for a chosen high-pass filter $\Phi(\ )$ is given by the following:

$$F_\Phi(I) = \mu\left(\left(\left|\Phi\left(\frac{I}{\mu(I)}\right)\right|\right)^\alpha\right)\sigma \qquad (3)$$

where I is the acquired image, $\mu(I)$ is the mean value of the pixel intensities of the image, and $\alpha$ and $\sigma$ are parameters that allow flexibility in finding the optimal FMF. $\alpha$ is typically 1 or 2, and is the power of the filtered image (i.e., the filtered image may be squared); $\sigma$ is a scaling factor (often 1,000). Although not required, either or both of $\alpha$ and $\sigma$ can be functions of the quantities on their left. In this case, FMF structure $F_\Phi(I)$ can be further optimized by varying the functions. The main difference between the different FMFs of this structure is a high-pass filter $\Phi(\ )$. The flexibility and adaptability of this structure is an advantage of some embodiments, as demonstrated below.

The following few paragraphs define and list filters employed in some embodiments. Detailed discussions and additional filters can be found in image-processing textbooks and technical manuals that evince the skill of those in the art (e.g., the IMAQ Vision Concept Manual from National Instruments, Austin, Tex., which is incorporated herein by reference).

Figure 2A:
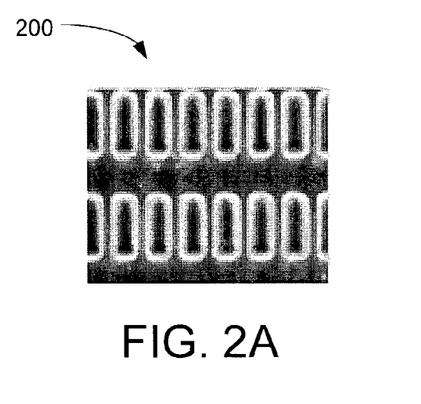
FIGS. 2A and 2B are a pair of sample images 200 and 205 used to illustrate methods in accordance with some embodiments.
Figure 2B:
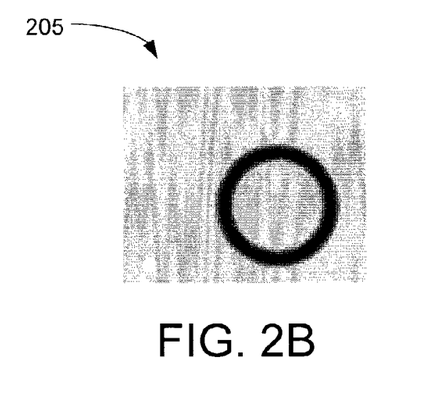

FIGS. 2A and 2B are a pair of sample images 200 and 205 used to illustrate methods in accordance with some embodiments. Image 200 depicts a highly magnified periodic structure on an inspected substrate, and image 205 depicts a fiducial mark on the same substrate. FIGS. 3A, 4A, 5A, 6A, and 7A plot focus measures as a function of Z position for image 200. Each figure employs a different permutation of the FMF structure of equation 3. FIGS. 3B, 4B, 5B, 6B, and 7B plot focus measures as a function of Z position for image 205 of FIG. 2B. Corresponding figures (e.g., 3A and 3B) used the same permutation of equation 3. The various permutations of equation 3 employ different filters Φ, described below, and a parameter value σ of 1,000. The parameter value α is one for the FMFs of FIGS. 3A/B, 4A/B, 5A/B, and 6A/B and two for the FMFs of FIGS. 7A/B. The plots represent a measure of image sharpness as a function of focus level (e.g., camera distance); ideally, their peaks correspond to best-focus levels.

The linear Laplacian filter is one of the most popular linear filters used in autofocusing. In discrete media a Laplacian filter is defined as a convolution filter with the following kernel:

$$\begin{bmatrix} |a| & |d| & |c| \\ |b| & x & |b| \\ |c| & |d| & |a| \end{bmatrix} \quad (4)$$

where $x=-2(|a|+[b]+|c|+|d|)$. In particular, the simplest finite difference analog of the continuous Laplace operator corresponds to the following kernel:

$$\begin{bmatrix} 0 & 1 & 0 \\ 1 & -4 & 1 \\ 0 & 1 & 0 \end{bmatrix} \quad (5)$$

Figures 3A, 3B:
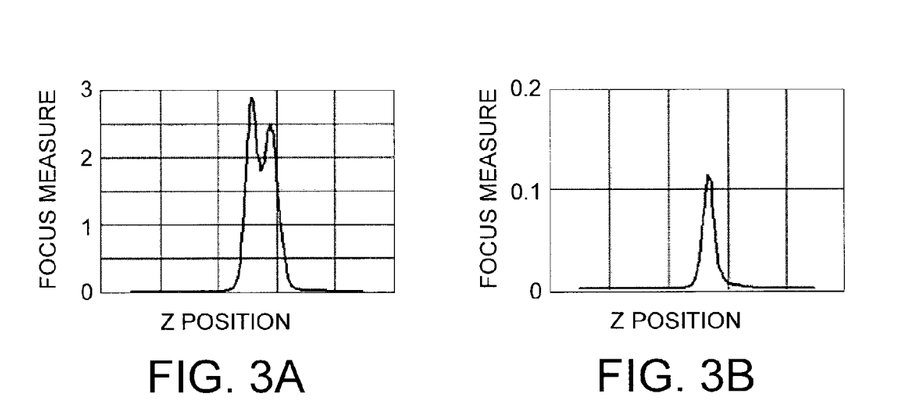
FIGS. 3A and 3B plot focus measures as a function of Z position for a Linear Laplacian FMF applied to respective images 200 and 205.

As depicted in FIG. 3A, the FMF of equation 3 is not unimodal for image 200. An embedded autofocus system using this filter could elect a Z position corresponding to the wrong peak, and thus fail to focus properly. This shortcoming is one justification to use nonlinear filters, although they also have other advantages, e.g., they typically require less computation.

Figure 4A:
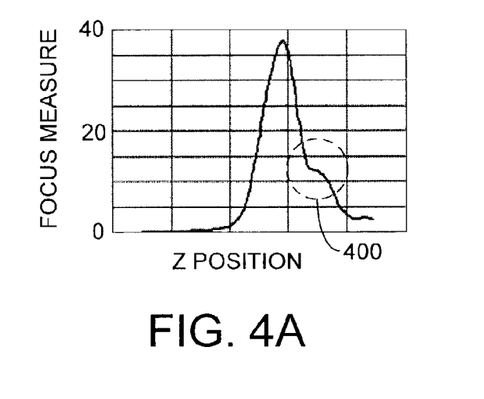
FIGS. 4A and 4B plot focus measures as a function of Z position for a Nonlinear Roberts FMF applied to respective images 200 and 205.
Figure 4B:
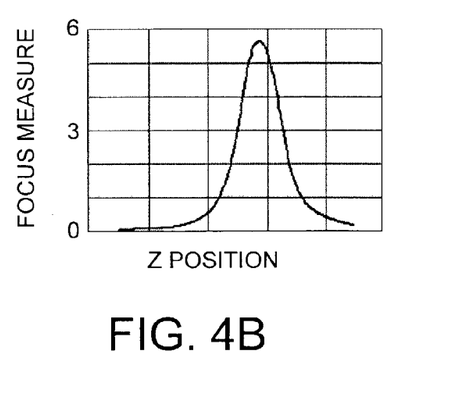

Nonlinear Roberts filters outline the contours that highlight pixels where an intensity variation occurs along the diagonal axis. The filtered value of a pixel becomes the maximum absolute value between the deviation of its upper-left neighbor and the deviation of its two other neighbors, given by:

$$I_{ij}=\max\{|I_{i-1,j-1}-I_{ij}|,|I_{i,j-1}-I_{i-1,j}|\} \quad (6)$$

where $I_{ij}$ refers to the intensity of the (i,j)th pixel of the image I. This filter is widely used in commercial auto-focusing systems for machine inspection products (e.g., ProbeMagic from TNP Instruments, Carson, Calif.). FIG. 4A demonstrates that this filter, although unimodal, has an undesirable "flat" region 400. The filter of equation 6 is therefore not the best option for image 200.

Nonlinear Differentiation filters produce continuous contours by highlighting each pixel where an intensity variation occurs between itself and its three upper-left neighbors. The filtered value of a pixel becomes the absolute value of its maximum deviation from its upper-left neighbors.

$$I_{ij}=\max\{|I_{i-1,j}-I_{ij}|,|I_{i-1,j-1}-I_{ij}|,|I_{i,j-1}-I_{ij}|\} \quad (7)$$

Figure 5A:
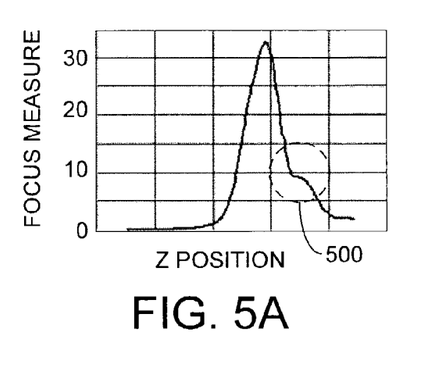
FIGS. 5A and 5B plot focus measures as a function of Z position for a Nonlinear Differentiation FMF applied to respective images 200 and 205.
Figure 5B:
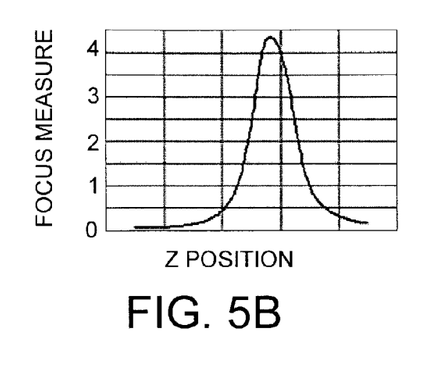

As depicted in FIG. 5A, this filter produces an undesirable flat region 500 similar to region 400 of FIG. 4A, and is consequently not the best option for image 200.

Nonlinear Gradient filters outline contours where an intensity variation occurs along the vertical axis. The new value of a pixel becomes the maximum absolute value between its deviation from the upper neighbor and the deviation of its two left neighbors:

$$I_{ij}=\max\{|I_{i,j-1}-I_{ij}|,|I_{i-1,j-1}-I_{i-1,j}|\} \quad (8)$$

Figure 6A:
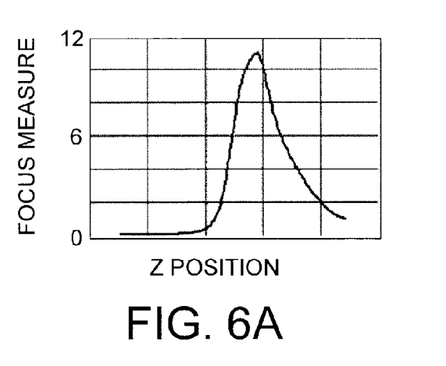
FIGS. 6A and 6B plot focus measures as a function of Z position for a Nonlinear Gradient FMF applied to respective images 200 and 205.
Figure 6B:
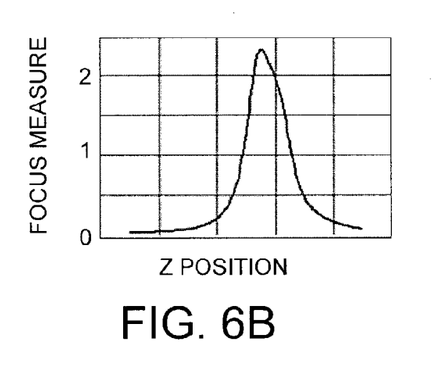

FIG. 6A demonstrates that this filter, as applied to image 200, is unimodal and lacks the flat regions of FIGS. 4A and 5A. The filter of equation 8 is preferred over those of equations 6 and 7 for application to image 200.

Figure 7A:
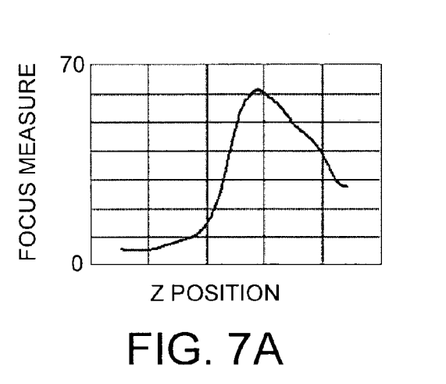
FIGS. 7A and 7B plot focus measures as a function of Z position for a Nonlinear Gradient FMF with different parameters than used in the FMF of FIG. 6.
Figure 7B:
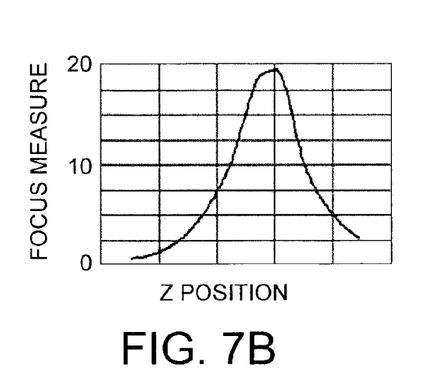

FIG. 7A shows an FMF plot for image 200 derived using the filter of equation 8 as the plot of FIG. 6A. The plots of FIGS. 7A and 6A differ, however, in that α=1 for the plot of FIG. 7A (recall that α=2 for the plot of FIG. 6A). Comparing the plots of FIGS. 6A and 7A, the first has better reproducibility (a sharper max) and the second has wider range. Reproducibility is more or less important than width, depending upon the employed autofocus method. As detailed below, scanning autofocus methods tend to benefits more from reproducibility than width, whereas gradient-based algorithms tend to benefit more from width than reproducibility. Part of the benefit of the FMF structure of equation 3 is that it can be adapted as desired to suit the needs of a given system.

Among other popular filters are Nonlinear Prewitt, Nonlinear Sigma, and Nonlinear Sobel. Among described and mentioned filters, Nonlinear Roberts and Nonlinear Gradient are relatively simple to compute. Roberts is more symmetrical than the Gradient and is a often good choice. However, the Nonlinear Gradient filter is preferable for image 200 because Nonlinear Roberts has a "flat" region in the out-of-focus position.

The discussion of FIGS. 3A through 7A illustrates the flexibility and adaptability of the disclosed FMF structure of equation 3, which makes the disclosed autofocusing methods adaptable to many images and systems. Furthermore, the same autofocusing software can be parameterized and used for several image acquisition types (e.g., infrared and visual), magnification levels, types of images (as illustrated in FIGS. 2A and 2B), and many other characteristics vital in machine inspection systems.

The foregoing details methods of obtaining acceptable focus measures; the following details how to use focus measures to establish and maintain best focus. We disclose two techniques for doing this utilizing the proposed FMF structure of equation 3. Although these two techniques are preferred, the usage of the FMF structure is not limited to these.

The first technique, scanning the vicinity of the best-focus position, scans the distance between the camera and imaged object, including the region that contains the focused position. During the scan, the values of the FMF corresponding to different positions are recorded. The camera is then moved to the position along the Z axis corresponding to the maximum focus measure, or FMF value. The second technique, gradient-based autofocusing, employs real-time, adaptive motion control to find and maintain the peak focus measure.

In the first approach, the focus position is carefully measured and set for fixed objects, while in the second approach, the object is kept in focus in real-time, even when the object is in motion with respect to the image detector. The first approach is useful in test sequences and would usually be applied after the XY stage has moved to the required position and before taking images for alignment, defect identification, or other machine vision applications. The second approach is useful for manual operations and during automatic transitions. In this case, an algorithm keeps the image detector in focus while an operator or control system moves the stages, changes hardware, etc.

Figure 8:
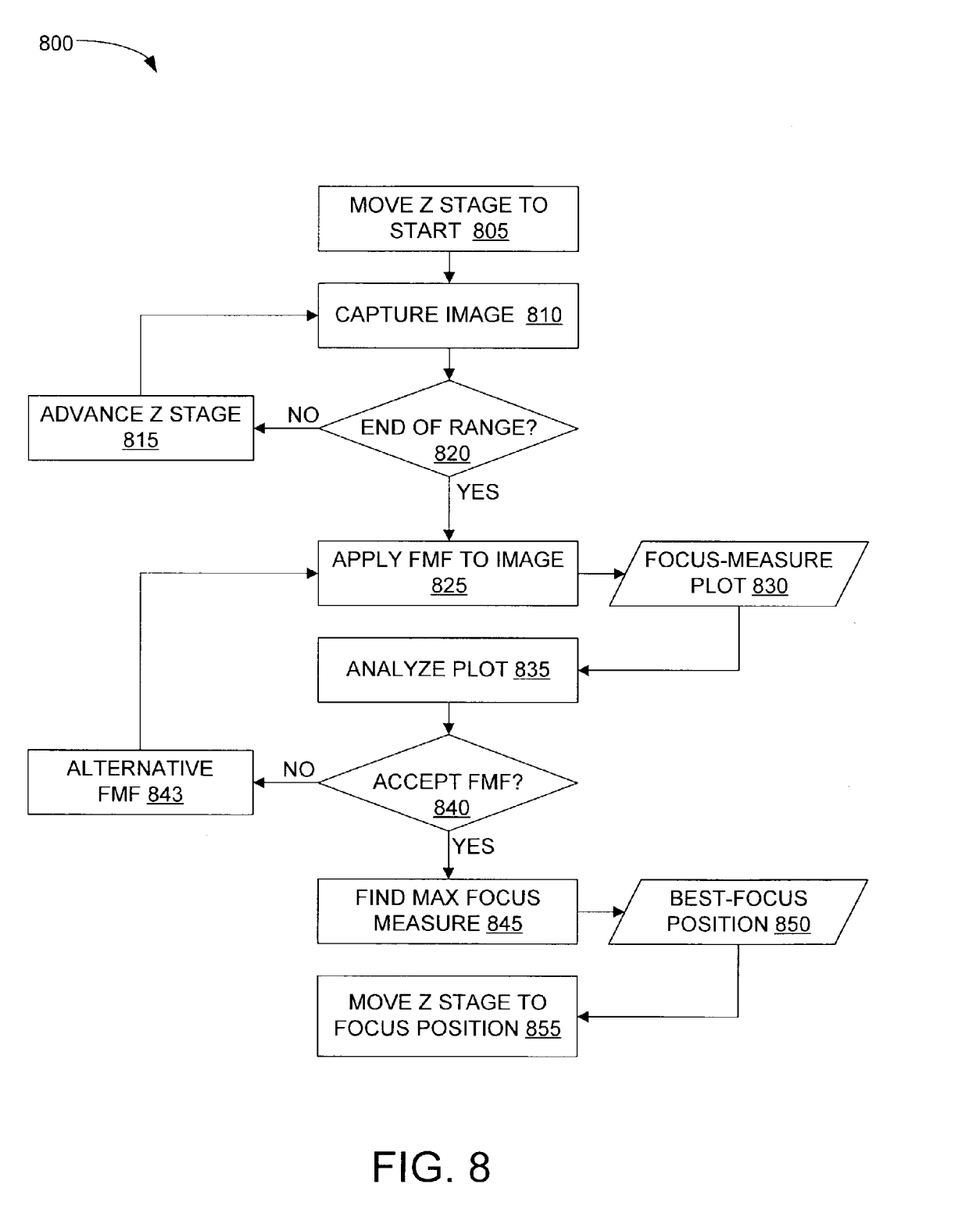
FIG. 8 depicts an autofocus algorithm 800 adapted in accordance with an embodiment that automatically select an optimal FMF for a given image.

FIG. 8 depicts an autofocus algorithm 800 adapted in accordance with an embodiment that automatically select an optimal FMF for a given image. First, motion controller 130—in response to commands from module 160—moves Z stage 135 to a starting position (step 805) and captures an image of the object of interest (step 810). Motion controller 130 then repeatedly advances Z stage 135 (step 815) and captures images (step 810) until Z stage 135 reaches the end of a pre-defined scan range (decision 820) encompassing the presumed best-focus position. Each image thus captured is forwarded to module 155 via frame grabber 125 for analysis.

An FMF, such as that of equation 3, is applied to the collection of images resulting from the repetition of step 810 (step 825), resulting in a focus-measure plot 830 of the type depicted in e.g. FIG. 6A. Image-analysis module 155 analyzes plot 830 (step 835) to determine whether plot 830 provides a suitable basis for automatically focusing on the imaged object. In one embodiment, step 835 notes the number of peaks, the sharpness of the peak or peaks, the width of plot 830, and the degree of noise. Per decision 840, if plot 830 fails to meet some minimum criteria (e.g., has two peaks as in FIG. 3A), an alternative FMF is selected for application to the image sequence and steps 825 and 835 are repeated. Alternative FMFs are tried (step 843) until decision 840 determines that a resulting plot meets the minimum criteria for autofocus. Other embodiments apply a number of FMFs to the image sequence and select the plot that best meets the image criteria of interest.

Having selected a preferred focus-measure plot, in step 845 image-analysis module 155 identifies the Z-stage location corresponding to the maximum focus measure as the best-focus position 850. (For noisy images, instead of searching for the maximum focus measure, it may be better to look for a peak and find its center.) Motion-control module 160 receives an indication of focus-position 850 from module 155 and, in response, instructs motion controller 130 to move Z stage 135 to focus position 850 (step 855), leaving image detector 105 focused on object 115.

FIG. 8 separates image acquisition and image analysis for ease of illustration. Practical systems can save time by performing image analysis in parallel with the image-capture sequence. Some embodiments maintains a list of image types and associated FMFs; in such cases, the flow of FIG. 8 can, for an image of a known type, select a preferred FMF in step 825 and then skip directly to step 845.

The main difficulty with the flow of FIG. 8 is coordination of motion and image acquisition. The calculation is straightforward. The size of acquired arrays is reasonably small (~200-300) and a simple search for a maximum value of the FMF data (i.e., the maximum focus measure) is effective. This method also eliminates the requirement of unimodality, convexity, and initial guesses required for function optimization procedures.

Figure 9:
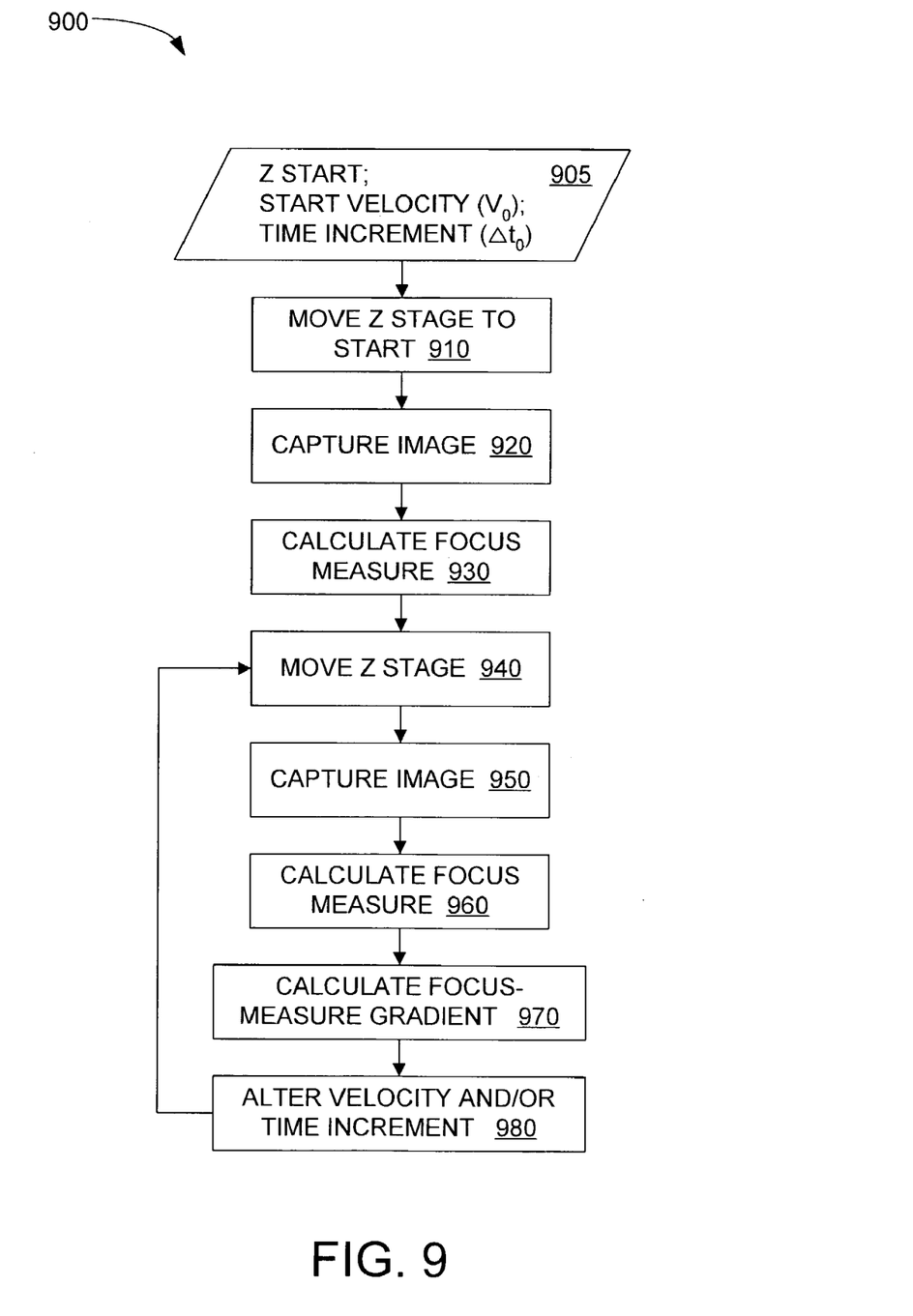
FIG. 9 depicts a flow diagram 900 in accordance with an embodiment that employs gradient-based, adaptive, real-time autofocusing.

FIG. 9 depicts a flow diagram 900 in accordance with an embodiment that employs gradient-based, adaptive, real-time autofocusing. The requisite hardware components may be as described above in connection with FIG. 1. The software components (modules 155 and 160) analyze the local behavior of the focus measure and determine the direction and velocity of the stage required to obtain and maintain focus.

Diagram 900 includes an initialization sequence (blocks 910, 920 and 930) followed by a loop (blocks 940, 950, 960, 970, and 980). System 120 stops the loop, e.g., in response to a user command or a system reset. Prior to starting, control system 120 receives a Z-stage start position from which to begin capturing images, an initial focus-level-adjustment velocity at which to move Z stage 135 between imaging steps, and a time increment T separating imaging steps (data 905). This initial position may be position 850 chosen by algorithm 800 of FIG. 8.

The process begins at step 910 when Z stage 135 moves image detector 105 to a starting position (e.g., above the assumed best-focus position). Control system 120 controls the motion of Z stage 135, moving image detector 105 to a start position (step 910) and acquiring the first image (step 920). Image analysis module 155 then calculates the first focus measure by applying an FMF to the image (step 930). After or during step 930, motion controller 130 causes Z stage 135 to begin moving in the direction of best focus (step 940) at the initial velocity specified in data 905. This movement continues for time increment Δt, after which frame grabber 125 captures the next image (step 950).

In step 960, image-analysis module 155 once again calculates a focus measure by applying the FMF to the most-recently captured image. Module 155 then calculates a focus-measure gradient from two or more of the most recent focus measures (step 970), the current velocity, and time increment Δt. This focus-measure gradient is normally a reasonable estimate of the gradient of the FMF. Image-analysis module 155 then calculates a new focus-level-adjustment velocity and/or time increment based upon the gradient (step 980).

The following describes several methods of calculating new velocities and time increments per step 980, including four adaptive control algorithms. With reference to FIG. 1, an idealistic assumption for algorithm development is that Z stage 135 has no inertia (i.e., that motion controller 130 can instantly change the velocity of Z stage 135). In this case the dynamics of stage 135 are given by:

$$\dot{z} = \frac{dz}{dt} = v \tag{9}$$

where v is the velocity to be calculated in step 980 (FIG. 9), and may depend on grad $F(z,t)=\partial F(z,t)/\partial z$ of focus measure F:

$$v=v(\mathrm{grad}F(z,t)) \tag{10}$$

Another simplifying assumption is that F is stationary, i.e., does not explicitly depend on time t. In this case, the stage should be moved in the direction of increasing FMF, i.e., the sign of v should be the same as the sign of the gradient, and in many cases the value of v is proportional to the gradient:

$$v=\beta \mathrm{grad}F(z) \tag{11}$$

where β is a coefficient of proportionality. This simplified model provides the basis for developing several real-time autofocus algorithms in accordance with various embodiments. The effectiveness of the implementation of these algorithms relies in part on recent advances in computer-based motion controllers (e.g., National Instruments, Delta Tau, Aerotech, etc.). These controllers provide an excellent servo-loop and can follow programmed trajectories, such as those specified by our simplified model, with very reasonable accuracy. The time variations (caused by changing images) of focus measure F(z,t) can also be ignored to some extent, provided the image detector is always within a range of the focus, i.e. in an attractive region of the global peak of the (non-stationary) focus measure.

In the control algorithms disclosed here, the velocity v=v(t) is chosen to be piecewise constant. Control system 120 can alter the velocity v at any time. Thus, for an interval of constant velocity one may have:

$$gradF(z) = \frac{dF}{dz} = \frac{dF}{dt}\frac{1}{v} \approx \frac{1}{v}\frac{F_i - F_{i-1}}{t_i - t_{i-1}} \quad (12)$$

where $t_i$ is the time of acquiring the image and calculating next the (i-th) focus measure $F_i$.

The specific algorithms disclosed herein are iterative, and therefore only the i-th iteration of diagram 900 (FIG. 9) will be described. In each iteration, system 100 acquires an image (step 950), calculates a focus measure (step 960) and focus-measure gradient (step 970), and updates velocity $v_i$ and/or time increment $\Delta t_i$ (step 980). At the beginning of i-th iteration, the velocity $v_{i-1}$ and focus measure $F_{i-1}$ from the last iteration are remembered.

We first introduce some notation to be used in the description of control algorithms in accordance with some embodiments. We define a function:

$$\text{range}(a, x, b) = \begin{cases} x, \text{ if } x \in [a, b] \\ a, \text{ if } x < a \\ b, \text{ if } x > b \end{cases} \quad (13)$$

and the following quantities:

z, $\Delta z$, dz—absolute and relative position of the stage in stepper-motor counts [c];

$\Delta z_r$, $dz_r$—relative position of the stage in rotations [r];

$\Delta z_r[c] = R[c/r] \cdot \Delta z[r]$, where $R[c/r]$ is number of counts in one revolution of the stage;

t, $\Delta t$, $t_i$, $\Delta t_i$—time and time intervals in seconds [s];

v, $v_{rpm}$, $v_i$—velocity in rotation per minute [r/m] or RPM;

$v_{cps}$—velocity in counts per second [c/s];

$v[r/m] = \mu[rs/cm] \cdot v_{cps}[c/s]$, where $\mu[rs/cm]$ is the conversion factor from counts per second to rotation per minute;

F, $F_i$—focus measures in arbitrary FMF units [u] (defined by acquisition and algorithm of calculation);

grad F—gradient of focus measure in FMF units per count [u/c]; and

α—coefficient between velocity (in [r/m] and gradient of focus measure in [u/c], where α is measured in [rc/mu].

In one embodiment, motion-control module 160 represents velocity in revolutions per minute (RPMs) and distance using stepper- or servo-motor counts.

FIGS. 10A through 10D are plots of focus measure FM and velocity V versus time, in seconds, for four gradient-based autofocus algorithms applied to the same image. Each algorithm employs the same FMF as discussed above in connection with FIG. 6A. The top plot of each figure shows the focus measure as motion controller 130 brings image detector 105 into focus, with the initial detector position corresponding to zero on the time scale. Following the flow of FIG. 9, the focus measures increase as the image detector approaches the best-focus position. The graphs of FIG. 10A through 10D demonstrate the relative performances of the control algorithms detailed below.

Figure 10A:
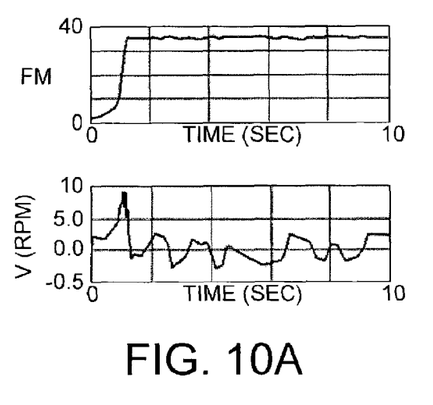
FIGS. 10A through 10D are plots of focus measure FM and velocity V versus time, in seconds, for four gradient-based autofocus algorithms applied to the same image.

Autofocus Algorithm #1 (Basic Gradient, FIG. 10a)

Given (input):

| | |
|---|---|
| $\Delta x$ [c] | the distance for gradient calculation (motion within this distance from focused position should not noticeably change the quality of image). |
| $v_0$ [RPM] | initial velocity. |
| $\alpha\left[\frac{rc}{mu}\right]$ | coefficient for velocity calculation. |
| $\mu\left[\frac{rs}{cm}\right]$ | conversion factor from [c/s] to [r/m]. |

Zero iteration (initialization):
1. Start (or change) motion with velocity $v_0$.
2. Acquire image and calculate focus measure $F_0$.

i-th iteration:
1. Calculate $$\Delta t_i = \frac{\mu \Delta x}{|v_{i-1}|}$$

and wait $\Delta t_i$ sec.

2. Acquire image and calculate focus measure $F_i$.
3. Calculate $$v_i = \alpha \frac{F_i - F_{i-1}}{\Delta x \operatorname{sgn} v_{i-1}}$$

and change stage velocity to this value.

4. Go to iteration i+1.

This is a straightforward gradient algorithm. $\Delta t_i$, calculated at step 1, is the time needed to cover the distance $\Delta_x$ with the current velocity $v_{i-1}$. This algorithm shows the best performance in the areas of large values of gradient where it is moving toward the maximum without restriction on velocity. A potential drawback of this algorithm is that near the focused position (and other intervals where gradient is small) $v_i$ may be very small, making $\Delta t_{i+1}$ very large, so the algorithm may be stuck waiting at step 1 for an undesirably long time. The following two algorithms provide a remedy to this problem.

Figure 10B:
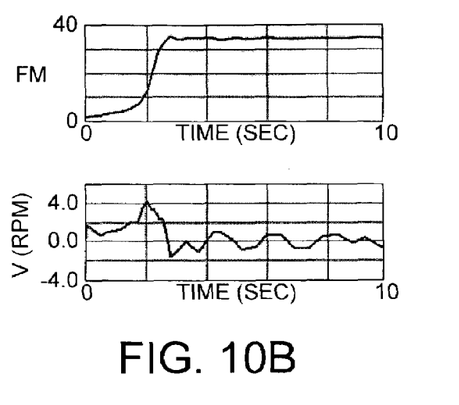

Autofocus Algorithm #2 (Restricted $\Delta t_i$, FIG. 10b)

Given (input):

| | |
|---|---|
| $\Delta x$ [c] | the distance for gradient calculation (motion within this distance from focused position should not noticeably change the quality of image). |
| $v_0$ [RPM] | initial velocity. |
| $\alpha\left[\frac{rc}{mu}\right]$ | coefficient for velocity calculation. |
| $\mu\left[\frac{rs}{cm}\right]$ | conversion factor from [c/s] to [r/m]. |
| $\Delta t_{max}$ [s] and $\Delta t_{min}$ [s] | restricted values for $\Delta t$. |

Zero iteration (initialization):
1. Start (or change) motion with velocity $v_0$.
2. Acquire image and calculate focus measure $F_0$.

i-th iteration:
1. Calculate $$\Delta t_i = \text{range}\left(\Delta t_{min}, \frac{\mu \Delta x}{|v_{i-1}|}, \Delta t_{max}\right)$$

and wait $\Delta t_i$ sec.
2. Acquire image and calculate focus measure $F_i$.
3. Calculate $$v_i = \alpha \mu \frac{F_i - F_{i-1}}{v_{i-1} \Delta t_i}$$

and change stage velocity to this value.
4. Go to iteration i+1.

Here, $\Delta t_i$ is restricted in the range $[\Delta t_{min}, \Delta t_{max}]$ and the difference $F_i - F_{i-1}$ is divided by $(v_{i-1}/\mu)\Delta t_i$ to calculate gradient, where $v/\mu$ is velocity in counts per second. A potential drawback of this algorithm is that velocity values are not restricted, so very small velocities may cause a noisy gradient calculation (if $v_i \Delta t_{max} \approx 0$), and very large velocities may move the stage too far (if $v_i \Delta t_{min} >> 1$). Outside of these areas (i.e. when $v_i \Delta t_i$ is neither too small nor too big), this algorithm demonstrates its best performance.

Figure 10C:
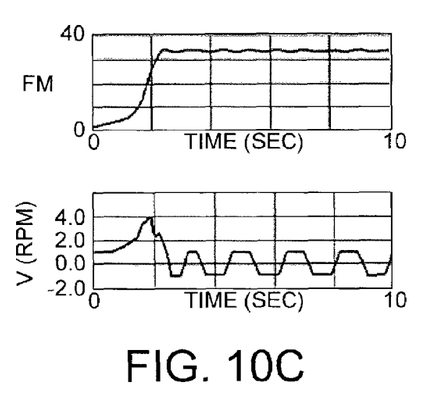

Autofocus Algorithm #3 (Restricted $|v_i|$, FIG. 10C)

Given (input):

| | |
|---|---|
| $\Delta x$ [c] | the distance for gradient calculation (motion within this distance from focused position should not noticeably change the quality of image). |
| $v_0$ [RPM] | initial velocity. |
| $\alpha\left[\dfrac{rc}{mu}\right]$ | coefficient for velocity calculation. |
| $\mu\left[\dfrac{rs}{cm}\right]$ | conversion factor from [c/s] to [r/m]. |

$|v|_{min}$ and $|v|_{max}$ in PRM.

Zero iteration (initialization):
1. Start (or change) motion with velocity $v_0$.
2. Acquire image and calculate focus measure $F_0$.

i-th iteration:
1. Calculate $$\Delta t_i = \frac{\mu \Delta x}{|v_{i-1}|}$$

and wait $\Delta t_i$ sec.
2. Acquire image and calculate focus measure $F_i$.
3. Change stage velocity to the value $v_i$ calculated by the following steps:

a. Calculate $$\hat{v}_i = \alpha \frac{F_i - F_{i-1}}{\Delta x \operatorname{sgn} v_{i-1}}$$

b. Calculate $|v_i| = \text{range}(|v|_{min}, |\hat{v}_i|, |v|_{max})$
c. Calculate $v_i = |v_i| \operatorname{sgn} \hat{v}_i$
d. Go to iteration i+1.

The main feature of this algorithm is a restriction on the absolute value of velocity while keeping correct sign. In this case $\Delta t_i$ is also within the limits $$\frac{\mu \Delta x}{|v|_{max}} \leq \Delta t_i \leq \frac{\mu \Delta x}{|v|_{min}}.$$

Experiments demonstrate that this algorithm behaves reasonably well in the whole range of $v_i \Delta t_i$. A potential drawback, however, is that no parameters exist that work well at all the ranges of $F_i$ values. This algorithm may therefore be most useful for a particular class of images. Different sets of parameters are required for focus measures of different images, e.g., the ones shown in FIGS. 2A and 2B.

The next algorithm is based on sign of gradient instead of gradient itself, and thus does not depend on the range of focus measures.

Figure 10D:
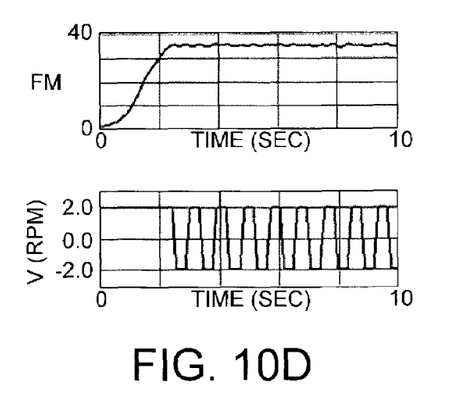

Autofocus Algorithm #4 (Constant $|v_i|$=V, FIG. 10D)

Given:

| | |
|---|---|
| $\Delta x$ [c] | the distance for gradient calculation (motion within this distance from focused position should not noticeably change the quality of image). |
| V [RPM] | absolute value of velocity. |
| $\alpha\left[\dfrac{rc}{mu}\right]$ | coefficient for velocity calculation. |
| $\mu\left[\dfrac{rs}{cm}\right]$ | conversion factor from [c/s] to [r/m]. |

Zero iteration (initialization):
1. Calculate $$\Delta t = \frac{\mu \Delta x}{V}.$$

2. Start (or change) motion with velocity +V
3. Acquire image and calculate focus measure $F_0$.

i-th iteration:
1. Wait $\Delta t$ sec.
2. Acquire image and calculate focus measure $F_i$
3. Calculate $v_i = V \operatorname{sgn} v_{i-1} \operatorname{sgn}(F_i - F_{i-1})$ and change stage velocity to this value (if necessary)
4. Go to iteration i+1.

A potential advantage of this algorithm is independence on the range of FMF values and good behavior at the ends of attractive regions where the gradient approaches a minimum (completely unfocused images). The price for this is the same velocity (V) inside a focus range in which relatively large gradients otherwise allow for higher velocities.

Figure 11:
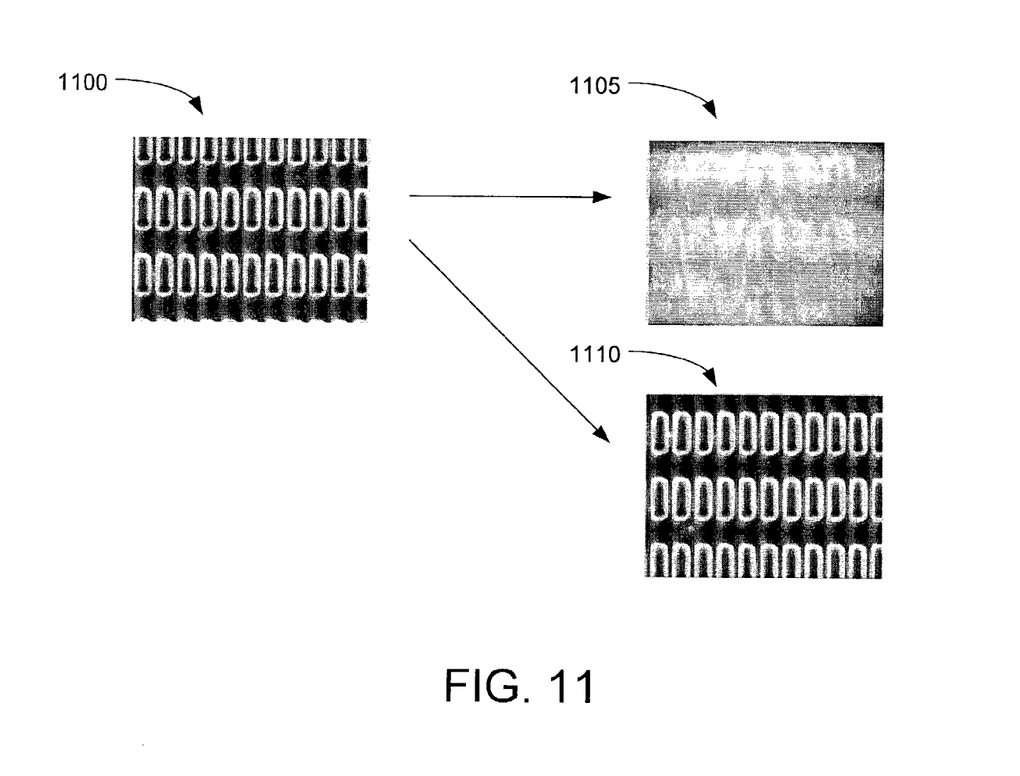
FIG. 11 illustrates the effectiveness of the foregoing algorithms in maintaining focus during movement of the object in the XY plane.

FIG. 11 illustrates the effectiveness of the foregoing algorithms in maintaining focus during movement of the object in the XY plane. System 100 (FIG. 1) captured an image 1100 of an area of object 115. XY stage 150 was then moved at five mm/sec, typical for some types of inspection. Prior to the move, autofocus was disabled and object 115 tilted with respect to the surface of stage 150 so image detector 105 lost focus as object 115 moved horizontally. System 100 then captured an additional image 1105 after the move. The test was then repeated, this time with autofocus enabled. The contrast between the resulting image 1110 and image 1105 demonstrates the effectiveness of the disclosed methods.

Figure 12:
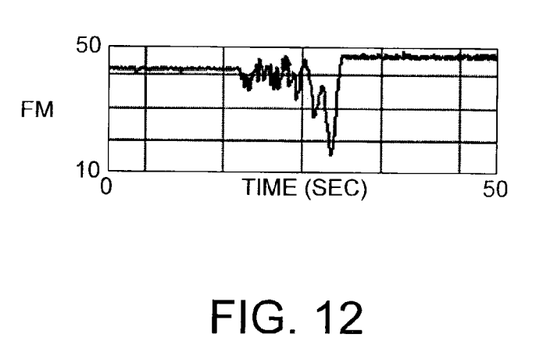
FIG. 12 depicts the dynamic response of the FMF used in the autofocus of FIG. 11.

FIG. 12 depicts the dynamics of the FMF used in the autofocus of FIG. 11 as XY stage 150 moves object 115 between coordinates. The low (<20) focus measure near the destination was the result of abrupt stopping of the stage rather than instability in the algorithm.

While the present invention has been described in connection with specific embodiments, variations of these embodiments will be obvious to those of ordinary skill in the art. The disclosed algorithms are universal, in the sense that they depend neither on type of the image (visual, infrared, spectrometric, scanning, etc) nor on image detectors. Due to this universality, the same implementation can be used in computer-based inspection systems for many different types of cameras and detectors as well as for a variety of magnification levels. The proposed autofocusing system can utilize the existing imaging hardware of the inspection system and does not require any additional components; computer software adapted in accordance with the invention can analyze images and generate appropriate commands to bring the image in focus. Moreover, autofocus need not be accomplished using a translation stage, as described above, but may instead control adjustable objects. Therefore, the spirit and scope of the appended claims should not be limited to the foregoing description.

What is claimed is:

1. A method for automatically focusing an image detector on an object, the method comprising:
    acquiring a first image of the object at a first focus level;
    applying a focus-measure function to the first image to obtain a first focus measure;
    moving from the first focus level towards a second focus level at a first focus-level adjustment velocity;
    calculating an amount of time to wait before acquiring a second image of the object at the second focus level;
    applying the focus-measure function to the second image to obtain a second focus measure;
    comparing the first and second focus measures; and
    moving from the second focus level to a third focus level at a second focus-level-adjustment velocity based on the comparing,
    wherein said comparing comprises:
    subtracting the second focus measure from the first focus measure and dividing the result by the change in focus level, and
    multiplying by a value representing the direction and magnitude of travel.

2. A method for automatically focusing an image detector on an object, the method comprising:
    acquiring a first image of the object at a first focus level;
    applying a focus-measure function to the first image to obtain a first focus measure;
    moving from the first focus level towards a second focus level at a first focus-level adjustment velocity;
    calculating an amount of time to wait before acquiring a second image of the object at the second focus level;
    applying the focus-measure function to the second image to obtain a second focus measure;
    comparing the first and second focus measures; and
    moving from the second focus level to a third focus level at a second focus-level-adjustment velocity based on the comparing,
    wherein said comparing comprises:
    subtracting the second focus measure from the first focus measure and dividing the result by the product of the first focus level adjustment velocity and a time measure representing the time between acquiring the first image and acquiring the second image, and
    multiplying by a value to adjust magnitude.

* * * * *